United States Patent
Park et al.

(10) Patent No.: US 7,910,821 B2
(45) Date of Patent: Mar. 22, 2011

(54) PHOTOELECTRODE OF DYE-SENSITIZED SOLAR CELL CONTAINING GLASS POWDER

(75) Inventors: Kyung hee Park, Gwangju (KR); Nam in Kim, Gwangju (KR); Hal bon Gu, Gwangju (KR); Hyung gon Jeong, Gwangju (KR)

(73) Assignee: Industry Foundation of Chonnam National University, Gwangju (KR)

( * ) Notice: Subject to any disclaimer, the term of this patent is extended or adjusted under 35 U.S.C. 154(b) by 212 days.

(21) Appl. No.: 12/310,006

(22) PCT Filed: Oct. 9, 2008

(86) PCT No.: PCT/KR2008/005917
§ 371 (c)(1),
(2), (4) Date: Mar. 9, 2009

(87) PCT Pub. No.: WO2009/048267
PCT Pub. Date: Apr. 16, 2009

(65) Prior Publication Data
US 2010/0288340 A1 Nov. 18, 2010

(30) Foreign Application Priority Data
Oct. 9, 2007 (KR) .................. 10-2007-0101251

(51) Int. Cl.
*H01L 31/042* (2006.01)

(52) U.S. Cl. ................................ 136/243; 136/244
(58) Field of Classification Search .............. None
See application file for complete search history.

(56) References Cited

U.S. PATENT DOCUMENTS

| | | | |
|---|---|---|---|
| 6,437,234 B1* | 8/2002 | Kyoda et al. | 136/250 |
| 6,469,243 B2* | 10/2002 | Yamanaka et al. | 136/263 |
| 2006/0174938 A1* | 8/2006 | Di Palma et al. | 136/263 |

* cited by examiner

*Primary Examiner* — Alexa D Neckel
*Assistant Examiner* — Shannon Gardner
(74) *Attorney, Agent, or Firm* — Christie, Parker & Hale, LLP

(57) ABSTRACT

A dye-sensitized solar cell containing glass powder and a method of manufacturing the same. The dye-sensitized solar cell is composed of a counter electrode obtained by forming a conductive light-transmitting layer on a light-transmitting material and then depositing a platinum catalyst layer on the conductive light-transmitting layer, a photoelectrode obtained by forming a conductive light-transmitting layer on a light-transmitting material, applying a mixture of transition metal oxide and glass powder on the conductive light-transmitting layer and then adsorbing a dye in the mixture, and an electrolyte solution between the counter electrode and the photoelectrode, the mixture layer of the photoelectrode containing 0.01~20 wt % of glass powder based on the total weight of the mixture. The glass powder mixed in the preparation of the photoelectrode can improve dispersion properties of light and can enhance use efficiency of light, thereby increasing the energy conversion efficiency of the dye-sensitized solar cell.

7 Claims, 5 Drawing Sheets

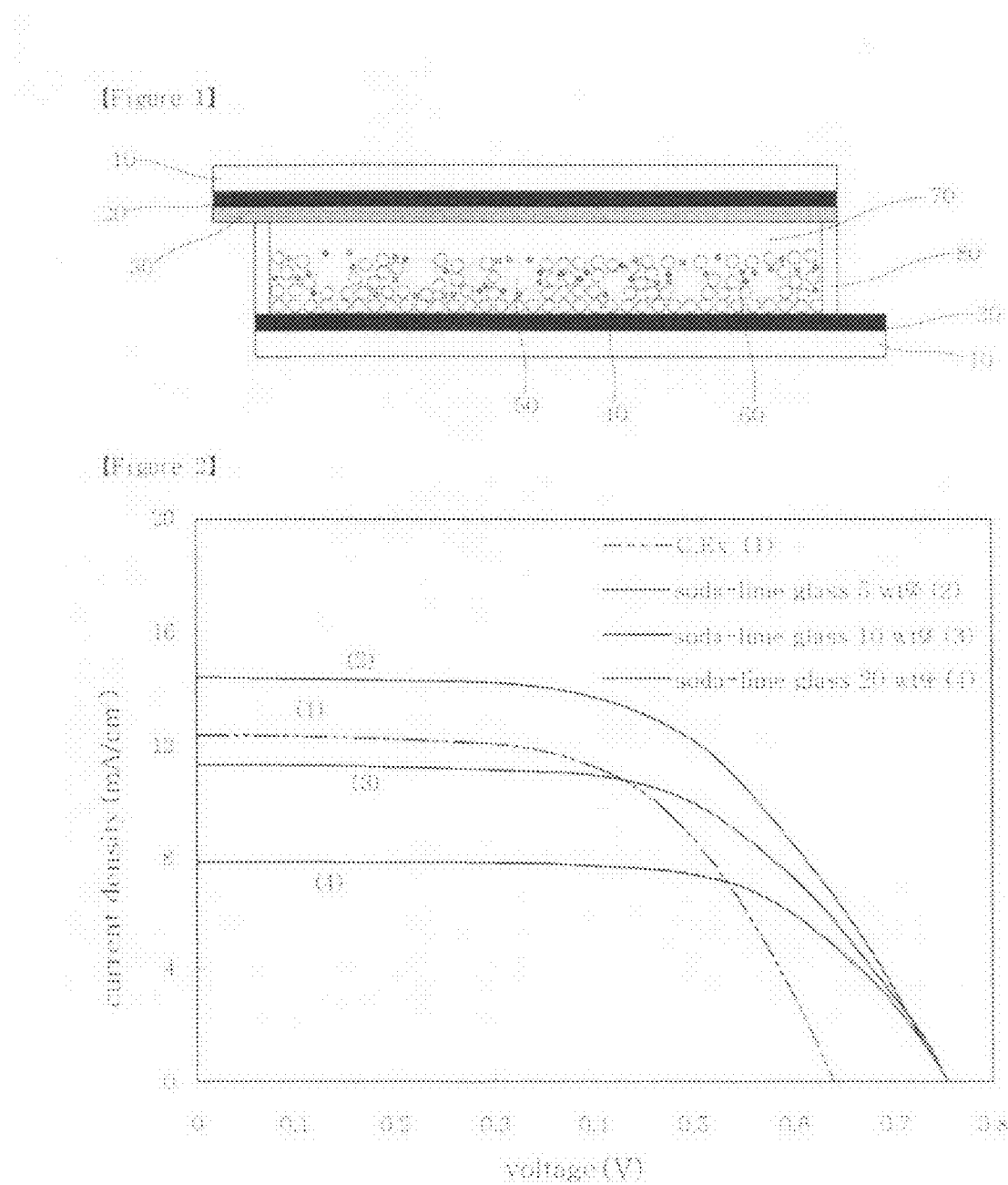

[Figure 3]
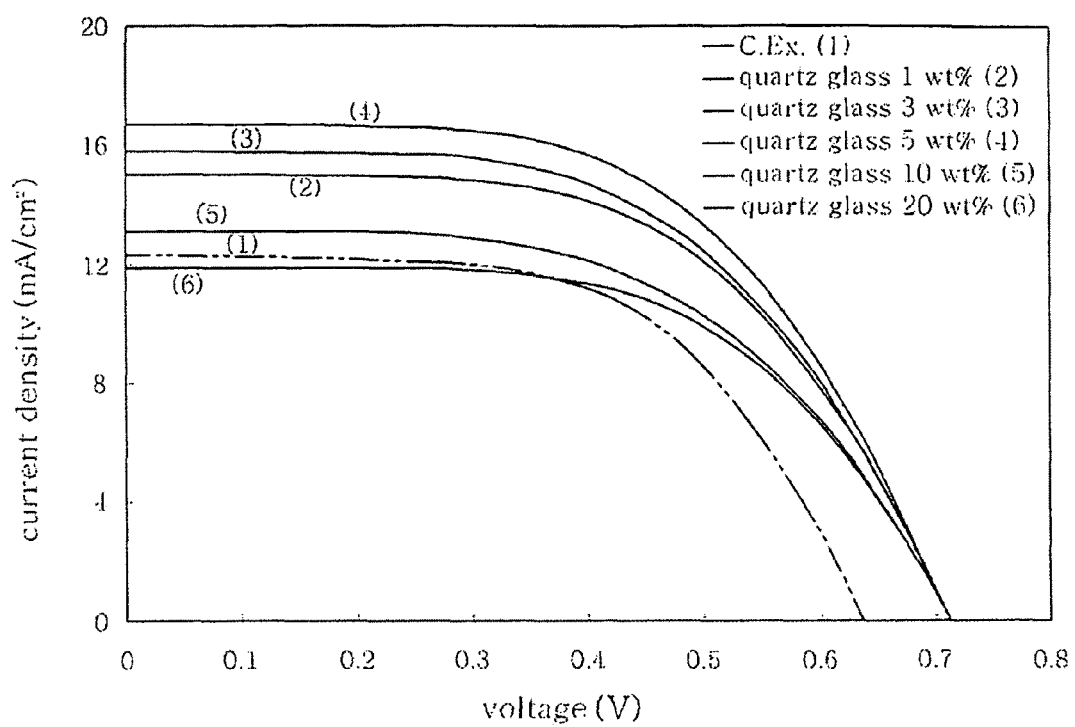

[Figure 4]
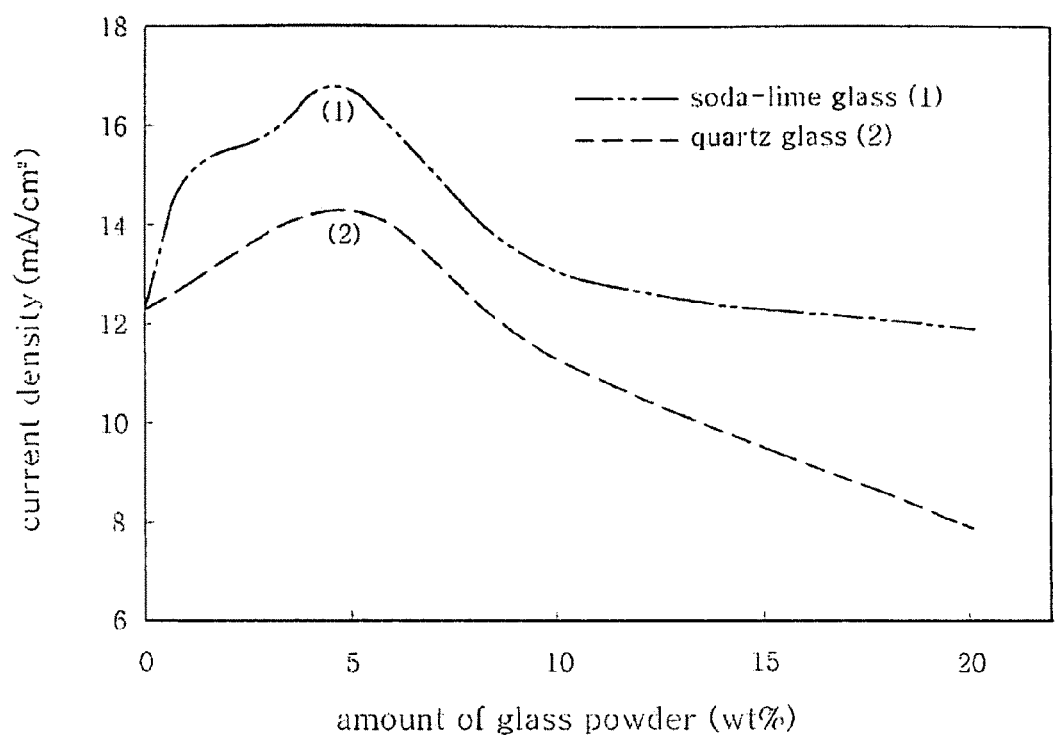

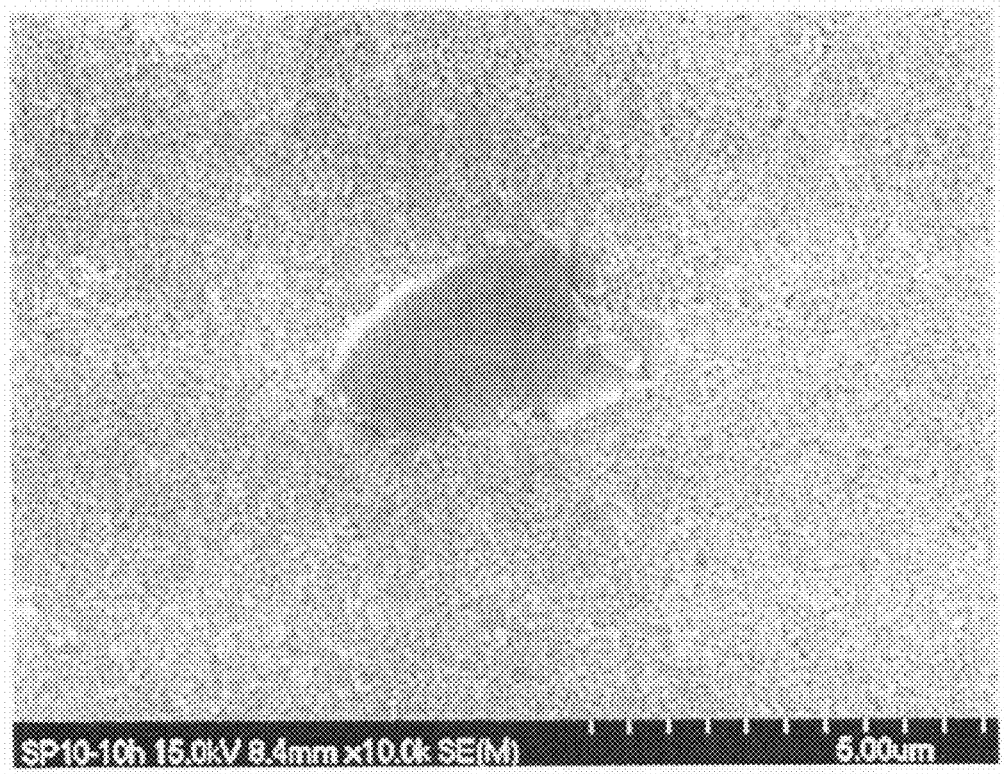
[Figure 5]

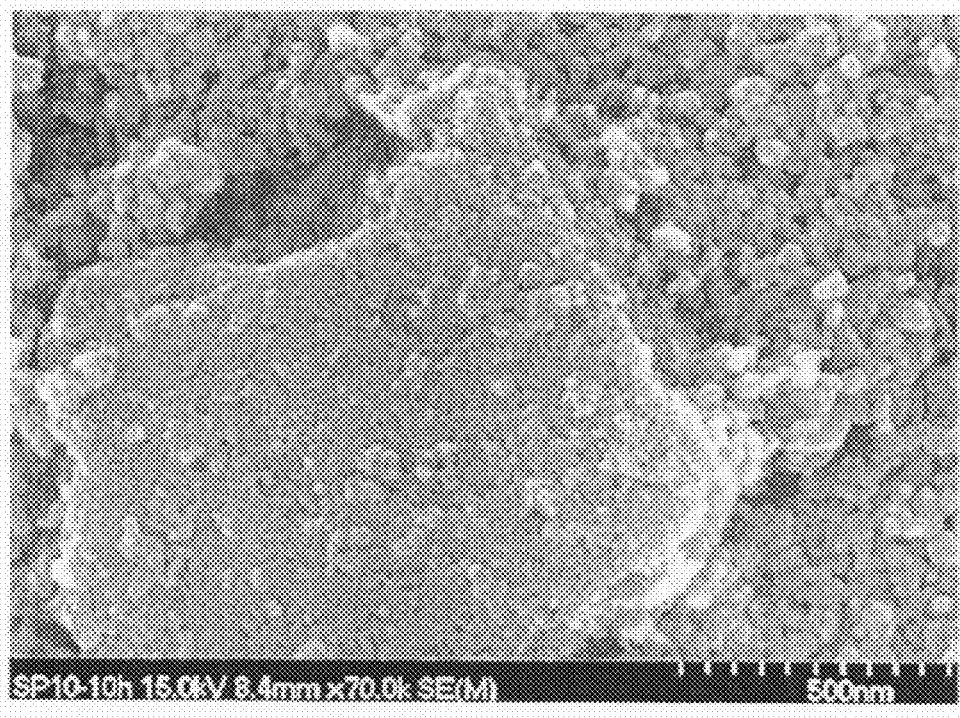
[Figure 6]

US 7,910,821 B2

PHOTOELECTRODE OF DYE-SENSITIZED SOLAR CELL CONTAINING GLASS POWDER

CROSS-REFERENCE TO RELATED APPLICATION

This application claims priority of International Patent Application No. PCT/KR2008/005917 filed Oct. 9, 2007, and Korean Patent Application No. 10-2007-0101251, filed on Oct. 9, 2008.

TECHNICAL FIELD

The present invention relates to a dye-sensitized solar cell containing glass powder and a method of manufacturing the same.

BACKGROUND ART

A dye-sensitized solar cell is advantageous because it is manufactured at a cost lower than when manufacturing a conventional silicon solar cell and exhibits high energy conversion efficiency in comparison to the cost. Further, the dye-sensitized solar cell may be provided in the form of a transparent and flexible cell, thus enabling the application thereof in various fields. The dye-sensitized solar cell is composed of a photoelectrode including dye molecules for absorbing light in a visible range to produce electron-hole pairs and titanium dioxide ($TiO_2$) transition metal oxide for transferring the produced electrons, and a counter electrode including a platinum layer functioning as a catalyst of a redox reaction of an electrolyte solution. The photoelectrode which is present in the form of a porous film is formed of an n-type oxide semiconductor having a wide band gap such as titanium dioxide ($TiO_2$), zinc oxide (ZnO) or tin oxide ($SnO_2$), the surface thereof being adsorbed with a dye in a monomolecular layer form. When sunlight is radiated onto the solar cell, electrons near the Fermi energy in the dye absorb the solar energy and are excited to an upper level that is not occupied with electrons. Further, the vacant lower level resulting from escape of the electrons is occupied again with electrons supplied by ions in the electrolyte. The ions that supply electrons to the dye move to the photoelectrode, so that they receive electrons. During this procedure, the platinum counter electrode acts as a catalyst for a redox reaction of the ions in the electrolyte solution, thus supplying electrons to the ions in the electrolyte via the redox reaction on the surface thereof.

In order to improve the energy conversion efficiency of the conventional dye-sensitized solar cell, Korean Unexamined Patent Publication No. 2003-0032538 discloses a method of increasing photocurrent, in which a mixture layer of titanium dioxide ($TiO_2$) and titanium silicalite-2 is formed to increase scattering of light so as to improve the ability of a dye to absorb light. In the manufacture of the conventional photoelectrode, the dye-sensitized solar cell resulting from the use of the mixture of titanium silicalite-2 is problematic in that the energy conversion efficiency for converting sunlight into electrical energy is still low. Therefore, many attempts to increase the efficiency of the solar cell are made.

DISCLOSURE

Technical Problem

Accordingly, the present invention has been made keeping in mind the above problems occurring in the related art, and an aspect of the present invention is to provide a dye-sensitized solar cell having high energy conversion efficiency and a manufacturing method thereof, in which glass powder is contained in a photoelectrode of the dye-sensitized solar cell, thus improving three-dimensional dispersion properties of light and enhancing the use efficiency of light, thereby realizing an energy conversion efficiency at least 1.5 times as high as that by conventional techniques without use of glass powder.

Technical Solution

According to the present invention, a dye-sensitized solar cell includes a counter electrode including a light-transmitting material, a conductive light-transmitting layer and a platinum layer, a photoelectrode including a conductive light-transmitting layer and a mixture layer formed of a mixture of transition metal oxide and glass powder, and an electrolyte solution between the counter electrode and the photoelectrode, wherein the mixture layer of the photoelectrode contains 0.01~20 wt % of glass powder based on total weight of the mixture of transition metal oxide and glass powder.

In the preferred embodiment, the glass powder of the mixture layer of the photoelectrode may be obtained by pulverizing either soda-lime glass or quartz glass.

In the preferred embodiment, the glass powder of the mixture layer of the photoelectrode may have a size of 1~10 μm.

In the preferred embodiment, the quartz glass may include 99~100 wt % of silicic acid ($SiO_2$) based on total weight of the quartz glass.

In the preferred embodiment, the soda-lime glass may include 70~75 wt % of silicic acid ($SiO_2$) and 10~15 wt % of soda ($Na_2O$) based on total weight of the soda-lime glass.

In addition, according to the present invention, a method of manufacturing a dye-sensitized solar cell is composed of preparing a mixture of transition metal oxide and glass powder so that an amount of the glass powder is set to 0.01~20 wt % based on total weight of the mixture; preparing a photoelectrode, which includes depositing a conductive light-transmitting layer on a light-transmitting material, applying the mixture on the conductive light-transmitting layer, performing drying and heat treatment, and adsorbing a dye in the mixture; preparing a counter electrode, which includes depositing a conductive light-transmitting layer on a light-transmitting material and applying a platinum layer on the conductive light-transmitting layer; and introducing an electrolyte solution into a space between the photoelectrode and the counter electrode and then sealing the photoelectrode and the counter electrode.

In the preferred embodiment, preparing the mixture of transition metal oxide and glass powder may include subjecting the transition metal oxide to stirring through 18~20 cycles using a stirrer, adding glass powder thereto, and then performing the stirring through 8~12 cycles, in which each cycle is composed of performing the stirring for 15 min and then resting the stirring for 5 min.

Advantageous Effects

According to the present invention, a dye-sensitized solar cell can have open circuit voltage (Voc) and short circuit current density (Isc), which are increased thanks to glass powder contained in a photoelectrode thereof.

The dye-sensitized solar cell according to the present invention can realize the energy conversion efficiency at least 1.5 times as high as that by conventional techniques without use of glass powder. The glass powder for dispersing light is added to transition metal oxide of the photoelectrode through which light passes, thus increasing the use efficiency of light, thereby enhancing the efficiency of the dye-sensitized solar cell.

DESCRIPTION OF DRAWINGS

FIG. 1 is a schematic cross-sectional view of the structure of a dye-sensitized solar cell according to the present invention;

FIG. 2 is a voltage-current graph depending on the amount of soda-lime glass powder;

FIG. 3 is a voltage-current graph depending on the amount of quartz glass powder;

FIG. 4 is a current density graph depending on the amount of glass powder;

FIG. 5 is a scanning electron microscope (SEM) image of the surface of the photoelectrode containing glass powder; and FIG. 6 is a 70,000× magnified SEM image of the surface of the photoelectrode of FIG. 5.

MODE FOR INVENTION

A dye-sensitized solar cell according to the present invention is composed of a counter electrode located at the upper portion of the solar cell and including a light-transmitting material 10, a conductive light-transmitting layer 20 and a platinum layer 30 which are sequentially disposed downward, a photoelectrode located at the lower portion of the solar cell to face the platinum layer of the counter electrode and including a light-transmitting material 10, a conductive light-transmitting layer 20 and a mixture layer of transition metal oxide 40 and glass powder 50 with a dye 60 adsorbed therein, which are sequentially disposed upward, and an electrolyte solution 70 charged in a space between the photoelectrode and the counter electrode. In the mixture layer of the photoelectrode, the glass powder is contained in an amount of 0.01~20 wt % and preferably 0.5~10 wt %, based on the total weight of the mixture of transition metal oxide and glass powder.

Also, a method of manufacturing the dye-sensitized solar cell containing glass powder according to the present invention is composed of preparing the mixture of transition metal oxide and glass powder so that the amount of glass powder is set to 0.01~20 wt % based on the total weight of the mixture, preparing the photoelectrode including depositing the conductive light-transmitting layer on the light-transmitting material, applying the above mixture on the conductive light-transmitting layer, performing drying and heat treatment and then adsorbing the dye in the mixture, preparing the counter electrode including depositing the conductive light-transmitting layer on the light-transmitting material and then applying the platinum layer on the conductive light-transmitting layer, introducing the electrolyte solution into the space between the photoelectrode and the counter electrode and sealing the photoelectrode and the counter electrode.

With reference to the appended drawings, preferred embodiments of the present invention are described below. FIG. 1 is a cross-sectional view showing the structure of the dye-sensitized solar cell according to the present invention. As seen in FIG. 1, the dye-sensitized solar cell is composed largely of the photoelectrode, the counter electrode, and the electrolyte solution 70.

The photoelectrode includes, in order to efficiently pass light therethrough, the light-transmitting material 10, the conductive light-transmitting layer 20, and the mixture layer of transition metal oxide 40 nanoparticles and glass powder with the dye adsorbed therein. The conductive light-transmitting layer, which functions to collect current upon operation of the solar cell, is coated with the mixture of transition metal oxide nanoparticles and glass powder, heat treatment is performed, and the dye is adsorbed into the mixture layer, thus preparing the photoelectrode.

The light-transmitting material may be a glass substrate or a plastic substrate, and the conductive light-transmitting layer may be made of any one selected from among FTO (Fluorine-doped Tin Oxide), ITO, ZnO—($Ga_2O_3$ or $Al_2O_3$), and $SnO_2$—$Sb_2O_3$. The transition metal oxide may include any one selected from among titanium dioxide ($TiO_2$), zinc oxide (ZnO), and tin oxide ($SnO_2$).

The dye may be adsorbed on the surface of the transition metal oxide nanoparticles and may include any one Ru composite which is commercially available at present selected from among N3 dye [cis-bis(isothiocyanato)bis(2,2'-bipyridyl-4,4'-dicarboxylato)-ruthenium(II)], N719 [cis-bis (isothiocyanato) bis(2,2'-bipyridyl-4,4'-dicarboxylato)-ruthenium(II)], and N749 [tris(isothiocyanato)-ruthenium(II)-2,2',6',2"-terpyridine-4,4',4"-tricarboxylic acid, tris-tertrabutylammonium salt], in order to absorb visible light.

The counter electrode includes the light-transmitting material 10, the conductive light-transmitting layer 20 formed on the light-transmitting material, and the platinum layer 30 acting as a catalyst formed on the conductive light-transmitting layer.

Like the photoelectrode, the light-transmitting material may be a glass substrate or a plastic substrate, and the conductive light-transmitting layer may be made of any one selected from among FTO, ITO, ZnO—($Ga_2O_3$ or $Al_2O_3$), and $SnO_2$—$Sb_2O_3$.

The electrolyte solution containing a redox couple (typically $I^-/I^{3-}$) is introduced into the space between the photoelectrode and the counter electrode, after which the photoelectrode and the counter electrode are sealed in a state in which an adhesive (hot melt) is located therebetween, thus completing the dye-sensitized solar cell.

EXAMPLE

The dye-sensitized solar cell according to the present invention was manufactured through the following procedures. 2 g of titanium dioxide ($TiO_2$), 0.4 g of polyethyleneglycol, 0.1 g of triton X-100, 1 ml of nitric acid solution, 0.2 g of acetylacetone, and 7 ml of purified water were placed into a stirrer and then stirred. As such, the stirring process was performed through 18~22 cycles, each cycle including performing stirring for 15 min and then resting the stirring for 5 min. Thereafter, glass powder was added thereto, and then the stirring process was carried out through 8~12 cycles, thus preparing the mixture. Preferably, the mixture was prepared by performing stirring through 20 cycles, adding the glass powder, and then performing stirring through 10 cycles.

The glass powder was prepared by pulverizing quartz glass or soda-lime glass to a size of 1~10 μm. The quartz glass was composed of 99~100 wt % of silicic acid ($SiO_2$) based on the total weight of the quartz glass, and the soda-lime glass was composed of 70~75 wt % of silicic acid ($SiO_2$) and 10~15 wt % of soda ($Na_2O$) based on the total weight of the soda-lime glass.

An FTO thin film was deposited on a glass substrate, the mixture was applied on the FTO thin film, drying was performed at 80° C. for 30 min, and then heat treatment was conducted at 450° C. for 30 min, thus preparing a photoelectrode. On the other hand, an FTO thin film was deposited on a glass substrate, a conductive light-transmitting layer was applied on the FTO thin film, and then a platinum sol (Pt catalyst/SP, Solaronix) was applied on the conductive light-transmitting layer, thus preparing a counter electrode. Subsequently, an electrolyte solution was introduced into a space between the counter electrode and the photoelectrode, after which the counter electrode and the photoelectrode were sealed, thus completing the dye-sensitized solar cell. In order to increase energy conversion efficiency, the amount of glass powder added to the photoelectrode was set to 0.01~20 wt % and preferably 0.5~10 wt % based on the total weight of the mixture of transition metal oxide and glass powder.

As a comparative example, a dye-sensitized solar cell was manufactured in the same manner as in the above example, with the exception that glass powder was not added upon preparation of the photoelectrode. The data of comparative example was compared with that of example.

FIG. 2 is a graph showing results of evaluation of voltage-current characteristics of the dye-sensitized solar cell containing soda-lime glass powder according to a first embodiment of the present invention. As is apparent from the results of FIG. 2, compared to the comparative example (1) including the photoelectrode of titanium dioxide transition metal oxide mixed without soda-lime glass powder, among cases of the example including the photoelectrode of titanium dioxide transition metal oxide mixed with soda-lime glass powder, the case (2) containing 5 wt % of soda-lime glass powder based on the total weight of the mixture of transition metal oxide and glass powder could be seen to be increased in Isc and Voc. The increase in Isc is considered to be because the use efficiency of light is increased thanks to the dispersion properties of glass powder mixed in the titanium dioxide nanoparticles, thereby increasing the ability of the dye to absorb light. Also, the increase in Voc is considered to be because recombination behavior of current is reduced due to silicon dioxide ($SiO_2$) as a main component of glass powder.

Table 1 below shows the electrical properties of the conventional dye-sensitized solar cell including the photoelectrode manufactured through the known process and the dye-sensitized solar cell containing soda-lime glass powder according to the first embodiment of the present invention, and also, Table 2 below shows the electrical properties of the conventional dye-sensitized solar cell including the photoelectrode manufactured through the known process and the dye-sensitized solar cell containing quartz glass powder according to a second embodiment of the present invention. The samples provided with the photoelectrode containing the glass powder according to the present invention could be seen to exhibit superior electrical properties.

TABLE 1

Voc, Isc, Energy Conversion Efficiency depending on amount of Soda-lime Glass

| | Soda-lime Glass (wt %) | Voc (V) | Isc (mA/cm$^2$) | Curvature (FF) | Energy Efficiency (%) |
|---|---|---|---|---|---|
| C. Ex. | 0 | 0.64 | 12.3 | 0.59 | 4.6 |
| Ex. 1 | 5 | 0.75 | 14.3 | 0.57 | 6.1 |
| | 10 | 0.76 | 11.3 | 0.58 | 4.9 |
| | 20 | 0.76 | 7.85 | 0.64 | 3.8 |

TABLE 2

Voc, Isc, Energy Conversion Efficiency depending on amount of Quartz Glass

| | Quartz Glass (wt %) | Voc (V) | Isc (mA/cm$^2$) | Curvature (FF) | Energy Efficiency (%) |
|---|---|---|---|---|---|
| C. Ex. | 0 | 0.64 | 12.3 | 0.59 | 4.6 |
| Ex. 2 | 1 | 0.71 | 15.0 | 0.57 | 6.1 |
| | 3 | 0.71 | 15.8 | 0.56 | 6.3 |
| | 5 | 0.71 | 16.7 | 0.57 | 6.8 |
| | 10 | 0.71 | 13.1 | 0.56 | 5.2 |
| | 20 | 0.71 | 11.9 | 0.59 | 5.0 |

FIG. 3 is a graph showing the results of evaluation of voltage-current characteristics of the dye-sensitized solar cell containing quartz glass powder according to the second embodiment of the present invention.

Compared to the comparative example containing no glass powder, in the dye-sensitized solar cell including the photoelectrode manufactured using 0.01~20 wt % of glass powder based on the total weight of the mixture of titanium dioxide transition metal oxide and glass powder, the cases where the glass powder was used in an amount of each of 1 wt % and 3 wt % had increased current density, and the case using 5 wt % of glass powder had the greatest current density. Further, when glass powder was used in an amount of each of 10 wt % and 20 wt %, the current density was rather reduced. This is considered to be because the quartz glass powder exceeds the optimal amount thereof to the titanium dioxide nanoparticles and thus acts as a resistance component. The Voc was the same even in any case containing quartz glass powder. This is considered to be because the conduction band is determined by the component, resulting in no change in voltage.

FIG. 4 is a graph showing the change in the current density depending on the amount of soda-lime glass powder and quartz glass powder. As is apparent from the results of FIG. 4, the optimal amount of glass powder to the titanium dioxide transition metal oxide was seen to be 5 wt % regardless of either soda-lime glass or quartz glass.

FIG. 5 is an SEM image of the surface of the photoelectrode prepared using 5 wt % of soda-lime glass powder based on the total weight of the mixture of titanium dioxide transition metal oxide and soda-lime glass powder. From this drawing, micrometer-scale glass powder was seen to be mixed in the titanium dioxide nanoparticles.

FIG. 6 is a 70,000× magnified image of the surface of the photoelectrode of FIG. 5. From this drawing, the titanium dioxide nanoparticles and the soda-lime glass powder were seen to be melted, thus enhancing light dispersion properties of glass powder and adsorption properties of the mixture of transition metal oxide and glass powder with the dye, thereby enabling the increase in the energy conversion efficiency.

INDUSTRIAL APPLICABILITY

Although the preferred embodiments of the present invention have been disclosed for illustrative purposes, the terms and words used in the specification and claims of the present invention should not be construed to indicate only typical or dictionary meanings, but should be understood as the meaning and concept adapted for the scope of the present invention. Therefore, those skilled in the art will appreciate that the embodiments of the present invention depicted in the drawings are merely illustrative and do not show the entire scope of the present invention and thus various equivalents and modifications in lieu thereof present at the point of time at which the present invention is filed also fall within the scope of the present invention.

The invention claimed is:

1. A dye-sensitized solar cell, comprising:
a counter electrode including a light-transmitting material, a conductive light-transmitting layer and a platinum layer;
a photoelectrode including a conductive light-transmitting layer and a mixture layer formed of a mixture of transition metal oxide and glass powder; and
an electrolyte solution between the counter electrode and the photoelectrode,
wherein the mixture layer of the photoelectrode contains 0.01~20 wt % of glass powder based on total weight of the mixture of transition metal oxide and glass powder.

2. The dye-sensitized solar cell according to claim 1, wherein the glass powder of the mixture layer of the photoelectrode is obtained by pulverizing either soda-lime glass or quartz glass.

3. The dye-sensitized solar cell according to claim 1, wherein the glass powder of the mixture layer of the photoelectrode has a size of 1~10 μm.

4. The dye-sensitized solar cell according to claim 2, wherein the quartz glass comprises 99~100 wt % of silicic acid ($SiO_2$) based on total weight of the quartz glass.

5. The dye-sensitized solar cell according to claim 2, wherein the soda-lime glass comprises 70~75 wt % of silicic acid ($SiO_2$) and 10~15 wt % of soda ($Na_2O$) based on total weight of the soda-lime glass.

6. A method of manufacturing a dye-sensitized solar cell, comprising:
preparing a mixture of transition metal oxide and glass powder so that an amount of the glass powder is set to 0.01~20 wt % based on total weight of the mixture;
preparing a photoelectrode, which includes depositing a conductive light-transmitting layer on a light-transmitting material, applying the mixture on the conductive light-transmitting layer, performing drying and heat treatment, and adsorbing a dye in the mixture;
preparing a counter electrode, which includes depositing a conductive light-transmitting layer on a light-transmitting material and applying a platinum layer on the conductive light-transmitting layer; and
introducing an electrolyte solution into a space between the photoelectrode and the counter electrode and then sealing the photoelectrode and the counter electrode.

7. The method according to claim 6, wherein the preparing the mixture of transition metal oxide and glass powder includes subjecting the transition metal oxide to stirring through 18~20 cycles using a stirrer, adding glass powder thereto, and then performing the stirring through 8~12 cycles, in which each cycle is composed of performing the stirring for 15 min and then resting the stirring for 5 min.

* * * * *